United States Patent [19]

Shepard

[11] 4,021,777

[45] May 3, 1977

[54] CHARACTER READING TECHNIQUES
[75] Inventor: David H. Shepard, Rye, N.Y.
[73] Assignee: Cognitronics Corporation, Stamford, Conn.
[22] Filed: July 23, 1976
[21] Appl. No.: 708,068

Related U.S. Application Data

[60] Continuation of Ser. No. 555,722, March 6, 1975, abandoned, which is a continuation of Ser. No. 359,555, May 11, 1973, abandoned, which is a division of Ser. No. 172,924, Aug. 18, 1971, Pat. No. 3,820,067, which is a continuation of Ser. No. 876,694, Nov. 14, 1969, abandoned, and a continuation-in-part of Ser. No. 701,670, Jan. 30, 1968, Pat. No. 3,582,884.

[52] U.S. Cl. .............. 340/146.3 AH; 235/61.12 N; 340/146.3 B
[51] Int. Cl.² ......................................... G06K 9/00
[58] Field of Search .......... 340/146.3 H, 146.3 AH, 340/146.3 B, 146.3 R, 146.3 ED, 146.3 A; 235/61.12 N, 61.12 R, 61.11 E

[56]         References Cited
         UNITED STATES PATENTS

| 3,264,610 | 8/1966 | Rabinow | 340/146.3 ED |
| 3,337,766 | 8/1967 | Malaby | 340/146.3 AH |
| 3,444,517 | 5/1969 | Rabinow | 340/146.3 B |
| 3,458,688 | 7/1969 | Garry et al. | 340/146.3 H |
| 3,709,525 | 1/1973 | Frank | 340/146.3 A |
| 3,810,094 | 5/1974 | Mori et al. | 340/146.3 AH |

*Primary Examiner*—Leo H. Boudreau
*Attorney, Agent, or Firm*—Parmelee, Johnson & Bollinger

[57]               ABSTRACT

A remote optical character recognition system including a central processor time-shared among a number of remote scanner units each adapted to receive a document bearing information characters to be scanned so as to produce corresponding signals which are transmitted to the central processor for analysis, whereby signals are developed identifying each of the information characters on the document. The document is additionally provided with control characters presented with a distinctive characteristic to enable the central processor to distinguish the control characters from the information characters. The central processor identifies the control characters and produces corresponding control effects related to procedures for scanning the document and processing the scan data. Certain of the control characters provide basic information concerning the particular customer whose document is being scanned, as well as initial instructions such as specifying portions of the document to be scanned. Other control characters relate specifically to corresponding information characters placed in directly associated data fields on the document.

2 Claims, 5 Drawing Figures

FIG. 2

Time Report for Larry Clark, Week Ending 09/19/69

| JOB NUMBER | SAT. | SUN. | MON. | TUES. | WED. | THUR. | FRI. | TOTAL |
|---|---|---|---|---|---|---|---|---|
| 604512 | | | 8.0 | 8.0 | | 6.0 | 5.5 | 27.5 |
| 922013 | | | | | 4.0 | 1.0 | 1.5 | 6.5 |
| 991018 | | | | | 3.5 | | | 3.5 |
| 710053 | | | | | .5 | 1.0 | | 1.5 |
| SUB-TOTAL | | | 8.0 | 8.0 | 8.0 | 8.0 | 8.0 | 40.0 |

Employee No. 1529, Dept. No. 0554

Signature: Larry Clark

CHARACTER READING TECHNIQUES

This is a continuation of application Ser. No. 555,722 filed Mar. 6, 1975, now abandoned, which in turn is a continuation of Ser. No. 359,555 filed May 11, 1973, now abandoned, which in turn is a divisional of Ser. No. 172,924 filed Aug. 18, 1971 now U.S. Pat. No. 3,820,067, which is a continuation of Ser. No. 876,694 filed Nov. 14, 1969 now abandoned and a continuation-in-part of copending application Ser. No. 701,670, filed on Jan. 30, 1968, now U.S. Pat. No. 3,582,884.

This invention relates to character reading apparatus and methods. More particularly, this invention relates to apparatus adapted to optically scan documents bearing characters to be read, and to produce output signals identifying such characters. The output signals typically are used as input information for a high-speed digital computer.

Optical character recognition apparatus of various types has of course been available and used for many years. Predominantly, such apparatus has been quite complex and expensive, and thus has been economically suitable only in special applications such as where the volume of reading required is relatively large. Various proposals therefore have been made from time to time for reducing the net operating cost in low-volume applications.

A significant step towards reducing operating costs is disclosed in pending application Ser. No. 701,670, filed by the present inventor on Jan. 30, 1963. That application shows a system including a central processor which is time-shared among a number of customers each having one or more remote scanner units adapted to receive a character-bearing document and to send the central processor electrical signals representing character information on the document. The central processor sorts out the received signals and performs a character recognition function to identify the individual characters on the scanned documents.

In a typical character recognition application, the documents to be scanned will not all be of the same type and thus ordinarily will require different processing procedures. This is of course the general case in a multi-customer time-shared system, because each customer will have an individual information format suited to his own needs. To avoid requiring batch-processing of separate categories of documents, that is, to permit intermixing of different types of documents, the processing procedures should automatically be matched to the particular document being scanned. This result has been uniquely achieved through basic concepts of the present invention.

In accordance with one specific aspect of this invention, certain functions of the scanner unit of an optical character recognition system are automatically controlled, in response to information derived from characters on the document being scanned, so as to carry out the scanning function with optimized effectiveness. In accordance with another specific aspect of the invention, control information derived from the scanned document determines the disposition to be made of the data represented by the information characters presented on that document.

In a preferred embodiment of the present invention, to be described hereinbelow in detail, the documents scanned consist of printed forms each presenting in its upper left-hand corner predetermined control character indicia related to the type and location of information characters to be inserted in specific subsequent places on the form. In one arrangement, the control indicia consist of a nineteen digit number; termed an Identification Number (or ID Number).

The first eight digits of the ID Number are referred to as the "Service Number", and identify certain detailed instructions concerning the processing of the document. For example, one digit may represent the vertical distance on the document between the control character group and the first text line of information characters, so that upon detection and decoding of that one digit, the processor can cause the scanner to skip quickly over the intervening space and initiate scanning of the information characters without undue delay. The next 10 digits of the ID Number are referred to as the "Customer Number", and identify the source of the document, as well as indicating, for example what disposition should be made of the scanned information. The last digit of the ID Number is a so-called check digit, used in known fashion to insure that the preceding digits of the control characters have been read accurately.

The document form is provided with additional control character indicia at various locations below the ID Number. These additional control characters, referred to herein as Field Codes, identify detailed instructions respecting the material appearing in particular data fields.

All of the digits of the control character indicia are scanned optically to produce, as described in the above-identified pending application Ser. No. 701,670, corresponding data signals which are transmitted to a central processor station where they are directed to conventional character recognition equipment (or analyzed through a sub-routine of the processor). The processor automatically identifies the first group of characters scanned from any document as the ID Number, and checks the group of characters to be sure that they are valid. The processor then analyzes selected characters of the group to determine the specific digits presented (i.e. 0, 1, 2 etc.), and produces corresponding function signals to further the processing of the document currently being scanned. The same general procedures are used in identifying the Field Codes and producing corresponding function signals as will be described.

These are a variety of different functions which can appropriately be carried out in this respect. For example, in the disclosed embodiment means are provided for (1) controlling the movement of the document through the scanning unit, (2) determining the horizontal segment of the document to be scanned, and (3) adjusting the threshold level of the electronic detector circuitry in the scanning unit. Still other functions relate to the processing of data by the computer, and the disposition of the recognized information characters, such as directing the information to storage, or to specified locations.

Accordingly, it is an object of this invention to provide improved apparatus, methods and techniques for processing documents by optical character recognition means. A more specific object of the invention is to facilitate the intermixing of different types of forms particularly in a remote optical character recognition system.

Other objects, aspects and advantages of the invention will in part be pointed out in, and in part apparent from, the following description considered together with the accompanying drawings, in which:

FIG. 2 shows an information form with preprinted control indicia; and

GENERAL DESCRIPTION OF SYSTEM

Figure 1:
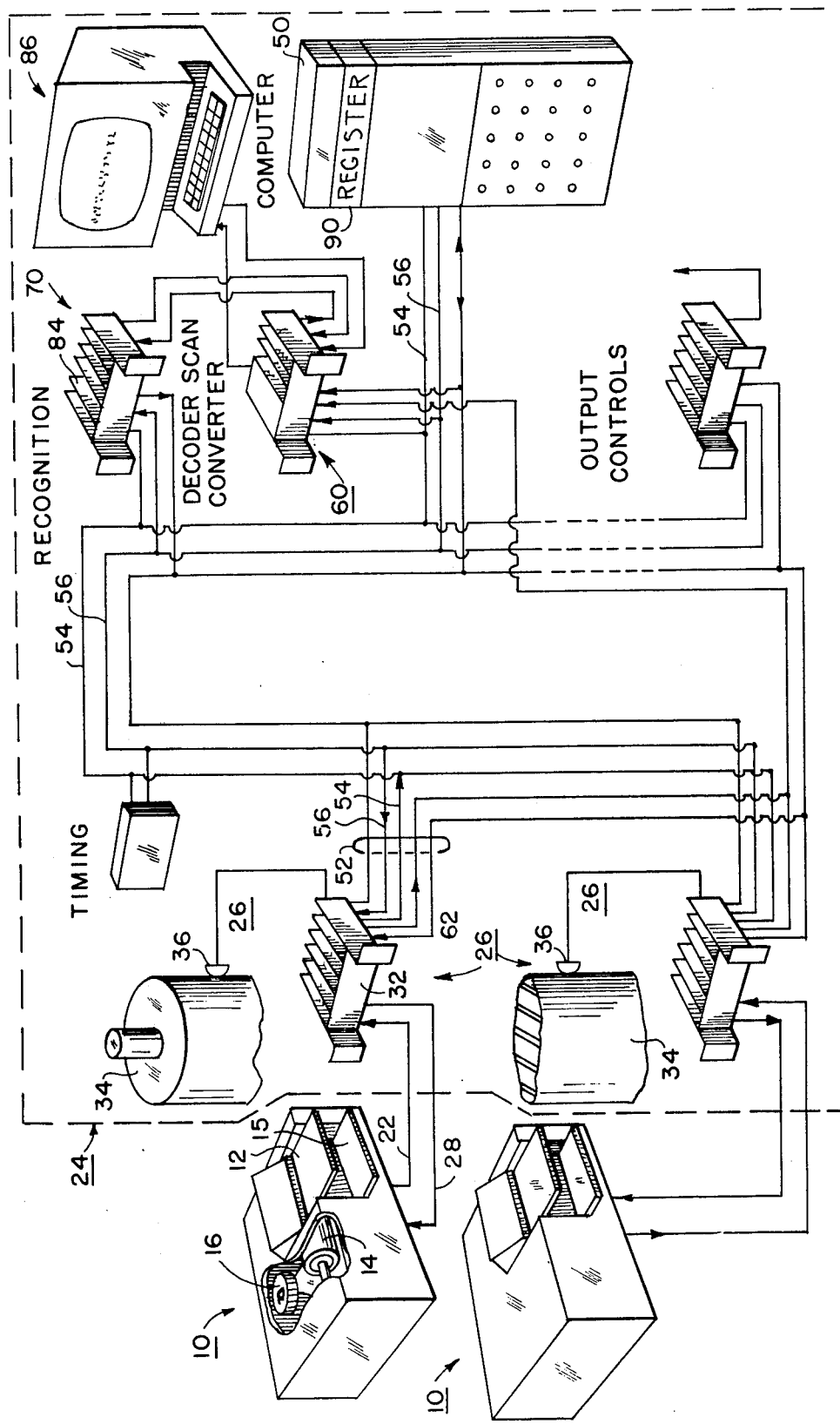
FIG. 1 is a schematic diagram showing the basic components of a system embodying and utilizing the present invention.

Referring now to FIG. 1, the system comprises a number of remote scanners 10 preferably of the type disclosed in copending application Ser. No. 624,445, filed Mar. 20, 1967, by E.J. Gushue and D.E. Shepard. Such a scanner is operated by inserting the document to be read into an infeed chute 12 with the lines of written characters extending from side-to-side, i.e. perpendicular to the direction of document movement. Conveying means within the scanner housing automatically grips and advances the document in a high-speed step-wise indexing movement around a drum 14 to an outfeed chute 15. While in the scanner, the document is examined by a small-diameter laser light beam which is swept from side-to-side across the document by a rotating multi-element mirror 16.

Between each indexing step of the drum, the light beam makes one pass horizontally across the document, parallel to the text lines of written characters on the document. The amount of indexing movement and the spot size on the document are substantially equal so that the spot traces out a series of contiguous horizontal paths through the lines of characters. This series of successive scans effectively covers all parts of the characters to be read.

The scanning of the document produces electrical signals indicating the presence or absence of character elements at evenly-shaped points along the scan path. These signals are used to generate code signals representing the basic scan data. The code signals are sent over a transmission line 22 to a central station 24 where the codes are accumulated in a corresponding line buffer 26.

The interconnecting circuitry between the scanner 10 and the central station 24 also includes a separate return transmission line 23 for communicating in the reverse direction. The return line 28 is used for sending to the scanner various operational commands, such as a "Read" command comprising a train of clock pulses to cause the unit to perform the scanning function. Other specific commands will be discussed hereinbelow.

The line buffers 26 comprise control circuitry 32 which directs the received code signals to a corresponding section of a rotating magnetic drum 34 for temporary storage while data for a complete line of characters is being accumulated. The control circuitry 32 also includes logic elements of known type to analyze each received code and (a) determine the presence of a special start-of-scan (SOS) code signal, (b) detect a certain code bit indicating that the code contains character data, and (c) reset to start condition if two start-of-scan signals are received with no intervening character data codes.

When logic elements of the control circuitry 32 detect a complete text line of characters, means are activated to send an "interrupt" signal to a conventional high-speed stored-program computer 50 connected to the line buffers 26 (as well as other peripheral devices) by the usual data-buss interconnection system generally indicated at 52. The interrupt signal from a line buffer is sent over line 54 and signifies to the computer that one of the peripheral devices is requesting action. The computer thereupon sends out on the "device selection" line 56 a "roll call" identifying each of the devices in sequence by special codes. The line buffer (or other device) requiring service responds to the computer on a separate so-called "skip line" (not shown) when its code is called.

The computer 50 follows a pre-set stored program of steps to determine what action is required, and then carries out such action. In the instance where a line buffer 26 signals that it has a complete text line of characters, the computer will order the character data transferred to a so-called "decoder scan converter" 60 which serves all of the line buffers on a time-shared basis. The computer also sends control signals causing the line buffer to read out its stored data to the line buffer data channel while the decoder scan converter receives and places that data in storage, typically a core memory. In one practical embodiment, such read-out from the line buffer drum required only between about 6 to 48 milliseconds, the exact time duration depending upon the amount of coded data needed to specify the complete text line of characters.

The decoder scan converter 60 serves primarily to translate the coded data received from the scanner 10 into the basic "black-white" format. That is, the decoder functions in effect to reverse the coding procedure which was carried out at the remote scanner. For this purpose, the converter 60 preferably comprises a multi-plane magnetic core storage unit having a storage bit corresponding to each "spot" examined (for black or white response) by the scanner in covering a complete line of text. For example, the core storage may provide space for the data from 48 sequential scans each having 1024 black-white bits. These bits of data are placed in the core storage in a manner effectively to reconstruct the raw data initially detected by the scanner 10, i.e. as it was before encoding for transmission to the central station.

When the decoder scan converter 60 has decoded and stored all of the data representing a complete line of text from one line buffer 26, it interrupts the computer 50 and sends a signal indicating that the decoded data is ready to be analyzed for recognition of the individual characters. Such analysis can be performed by a character recognition circuit generally illustrated at 70. The analysis may alternatively be carried out by the computer, acting under the control of a stored program such as disclosed in copending application Ser. No. 758,219, filed by the present applicant on Sept. 9, 1968.

The decoded data is read-out to the recognition circuit 70 in a stream of data bits like that which would have been produced by a conventional optical scanner making a series of consecutive vertical sweeps through each character in sequence. This stream of data is analyzed in a logical pattern to produce output signals identifying each character in sequence. These character signals are stored in a register 90 in the computer 50 corresponding to the originating remote scanner 10, for further processing as will be described.

THE PREPROGRAMMED FORM

FIG. 2 illustrates a typical business form 100 in accordance with the present invention. This form is basically a conventional time sheet such as are used by corporations of recording the time spent by their employees on various jobs during a weekly period. In the left-hand column are spaces for the employee to fill in the job numbers. Subsequent columns for each day of the week provide a three-unit space for filling in the number of hours (to tenths) worked on a particular job on each day. The form includes spaces for totalizing these figures both horizontally and vertically.

In the upper left-hand corner of the form 100 is a so-called Identification Number (ID Number) generally indicated at 102. This form with its ID Number is associated with a specific customer of a remote optical character recognition system such as shown in FIG. 1. The customer will have on his premises one or more of the remote scanner units 10, which will transmit to the central processor scan data from the forms 100 (and other forms where appropriate). The central processor first identifies the ID Number from the distinctive characteristic of its location on the form. The central processor receives from individual digits of that number certain basic starting instructions directing various parts of the system to carry out particular operations specifically devised for handling the document form then in the scanner.

Preferably, all indicia pre-printed on the document form 100, with the exception of the control code characters, is of a color to which the scanner 10 does not respond. For example, with a particular type of red-light laser found useful in such scanning operations, the non-control indicia on the form is also of a red color. By proper selection of the red ink color, the reflected light intensity will be equal to that from the white background, i.e. the detector will be "blind" to the red printing. Thus, the scanner will respond only to the control characters and the information characters placed in the assigned spaces on the form.

The first eight digits of the ID Number 100 are the so-called Service Number. This number identifies the class of form, and contains the basic initial instructions as to where the information is located on the form, the type of characters on the form, and what is to be done respecting the information.

The first digit of the Service Number identifies the specific type of program to be carried out. In the case of all preprogrammed forms carrying various supplementary control code groups (so-called Field Codes as will be described herein), this number is always a 1.

The second digit of the Service Number defines the initial vertical "skip distance", i.e. the vertical distance on the form 100 between the ID Number and the first text line containing characters to be scanned for recognition purposes. The central processor includes means responsive to this code digit for controlling the movement of the document through the remote scanner, so as to skip from the control characters of the ID Number directly to the position where the next set of characters to be scanned is located. Various skip distances can of course be assigned to specific numbers of the second digit. In one arrangement, the numbers represented skip distances of ⅓ inch increments, i.e. the number 1 meant "skip one-third inch", the number 2 meant skip "two-thirds of an inch," etc.

The third digit of the Service Number defines the initial horizontal scan zone, that is, the horizontal segment where the characters to be scanned will be located. Various arrangements for relating the numbers 0-9 to specific scan zones can of course be devised. One possible arrangement is as follows:

| Digit Value | Scan Segment |
|---|---|
| 0 | 100% |
| 1 | 0-30% |
| 2 | 0-40% |
| 3 | 0-50% |
| 4 | 50-100% |
| 5 | 0-65% |
| 6 | 0-75% |
| 7 | 0-80% |
| 8 | 0-90% |
| 9 | Special (unassigned) |

The fourth digit of the Service Number defines the class of characters to be scanned, i.e., it specifies whether the character set includes only numerics, or alphanumerics, and what type front is expected.

The fifth digit of the ID Number defines the output format. For example, the number 0 may ndicate a variable length record, with character sequence the same as in the input document, whereas the number 1 may indicate a fixed length record, e.g. 80 characters long.

Digits 6-8 of the Service Number are available for various control functions, such as designating the disposition of the processed data. For example, a 0 for the sixth digit may indicate that the recognized characters should be transferred to storage at the central station, for subsequent delivery to the customer, whereas the number 1 may indicate that the recognized character data is to be sent immediately to the customer by remote transmission for storage on magnetic or paper tape.

The Customer Number, represented by digits 9-18, serves primarily to identify the customer so as to facilitate various processing routines, including billing and the like. For example, digits 9-11 may be the customer's telephone area code, and digits 12-16 may be the first five digits of the customer's telephone number. Digits 17 and 18 may be used to identify the particular job or application represented by the document.

The nineteenth digit preferably is a check digit, for example a digit developed in accordance with Luhn's scheme, applicable to all 18 preceding digits. The computer 50 examines the entire ID Number, including the check digit, to determine whether the number is a "checking number", i.e. wherein the sum of the check digit and all of the other digits (including certain substitutes according to a predetermined pattern) is a multiple of ten.

FIELD CODES

The document form 100 includes a second type of control code 106 at various locations in the data fields below the ID Number 102. These control codes, termed "Field Codes", are not identifiable as such by their location on the document, as is the ID Number. Instead, they are provided with a distinctive stylistic characteristic embodied in the character format, specifically (in the preferred embodiment) a special corner bracket 110 adjacent the upper left-hand corner of the first digit of each such control code group. Such control codes preferably are a consecutive series of numbers. Typically, information data to be filled in on the form will follow a control code group after an intervening space.

Each of these Field Codes ordinarily is associated with a specific data field of the document. The Field Codes identify detailed instructions concerning the associated field, such as by giving a single order to be obeyed, or a definition of exactly what is to follow.

In the embodiment disclosed herein, the first digit of each Field Code indicates its field type, whereas the second, and succeeding digits (if any), indicates an argument in the mathematical sense, i.e. a number of characters, a distance, or the number permitted in the field. Various specific meanings can be assigned to the control code digits, and the following describes one practical example of the kind of coding which can be utilized:

The control digit $\overline{1}$ indicates that information following the control code group (until another countermanding control code is encountered) is a single fixed-length field, as defined by the second code number (following the $\overline{1}$), and in all parts of which data must be present.

The control digit $\overline{2}$ has the same significance as $\overline{1}$ except that the field must also be a checking number.

The control digit $\overline{3}$ indicates that the following field is of variable length, but not to exceed the length indicated by the second digit of the control code.

The control digit $\overline{4}$ has the same significance as $\overline{3}$ except that the code contains a third digit which indicates a minimum length allowed.

The control digit $\overline{5}$ indicates that the following field is associated with an accumulator, as defined by the succeeding digits which must be on the same line.

CODE FORMAT $\overline{5}$XYZ

X = accumulator function
Y = maximum length of the field
Z = minimum field length Value of X 1 = Add field contents to accumulator, and check Z
2 = Subtract field contents from accumulator, and check Z
3 = Compare field contents to the accumulator, and check Z
4, 5, 6 = Same as 1 2, 3 respectively, except that Z is not specified.

The control digit $\overline{6}$ specifies a change in the horizontal scan pattern; the control code digits following 6 are used to define the new scan zone desired.

The control digit $\overline{9}$ indicates that the following control digits of the group represents a code of a special category; for example $\overline{9}0$ indicates that the line contains only control codes, until the code 0 is encountered, and is a format to be followed in all succeeding lines (until countermanded by a new control code); each such code applies to the field below starting in identical horizontal positions.

The control code $\overline{9}$1X commands that the scanner 10 skip the distance represented by X after completing the line of text in which the control code was encountered. Various digits may of course be assigned specific skip distances, and one number such as 0 may direct the scanner to "skip out" the document, i.e. advance it at maximum speed through the scanner and out the exit slot.

The control digit $\overline{0}$ indicates that the following digit of the code is the check digit for all control codes on that line. A specific control digit, such as $\overline{0}$, can be used at the start of a line to serve as a bench mark or reference point for skew compensation, to assure that the beginning and ending points of the fields are properly located.

Referring now to the specific Field Codes shown on the document 100, the code $\overline{2}4$ indicates that the corresponding field is fixed length, and contains four digits including a check digit. The code $\overline{1}6$ indicates a fixed length field of six digits, with no check digit. The code $\overline{0}6$ gives the number 6 as the check digit for all of the control codes on the line. Such an identified check digit may if desired also indicate the end of the data to be scanned from that line.

The code $\overline{9}0$ indicates that the line contains only control codes, and that such codes apply to the fields in lines below the code line. The immediately following code $\overline{2}6$ thus identifies the six-digit field (column) for inserting job number, and indicates that each job number is arranged as a checking number to be analyzed for that characteristic. Similarly, the code $\overline{3}1$ indicates a field having no more than one digit, for the column representing the type of activity one digit, for the column representing the type of activity performed by the employee. Each of the codes $\overline{5}43$ identifies respective three-digit fields the data from which is to be added to the accumulator of the computer. The code $\overline{5}630$ identifies a three-digit field the data from which is to be compared to the amount in the accumulator to check for equality; if not equal, the computer will issue a reject signal. The code $\overline{9}51\ \overline{9}10\ \overline{0}3$ is an end-of-page designator, commanding that the document be skipped out of the scanner.

SYSTEM DETAILS

It already will be apparent from the above description how the system operates automatically, with the aid of the pre-programmed form 100, to carry out specific tasks pertinent to the particular form and the data filled in on that form, without the need for such specific programming instructions to be developed for each individual application and inserted ahead of time in the computer 50. That is, the computer will be programmed in general to examine the control code indicia on each form scanned, and the particular indicia printed on the form will in effect complete the program instructions for the required processing of the document. Thus the forms can be intermixed in a scanner without loss of operating efficiency, and a number of customers can be handled by one time-shared computer without requiring specific instructions in the computer program related to particular customers.

The central station 24 contains the electronic facilities to accomplish the tasks already explained, including the tasks of distinguishing the control character indicia from the information characters, decoding the control characters, developing in response to such decoding suitable function or "action" signals for effecting a particular result (such as operating the drum stepping motor of the scanner), and directing signals to appropriate apparatus for executing the desired command. Suitable electronic facilities for accomplishing such tasks can take many forms, and the detailed nature of such facilities will be apparent to those skilled in the art. In general, most of the tasks can with advantage be performed by a high-speed time-shared computer operating under stored-program control, and skilled programmers can within the known boundaries of their art devise suitable instructions for the computer.

Figure 3A:
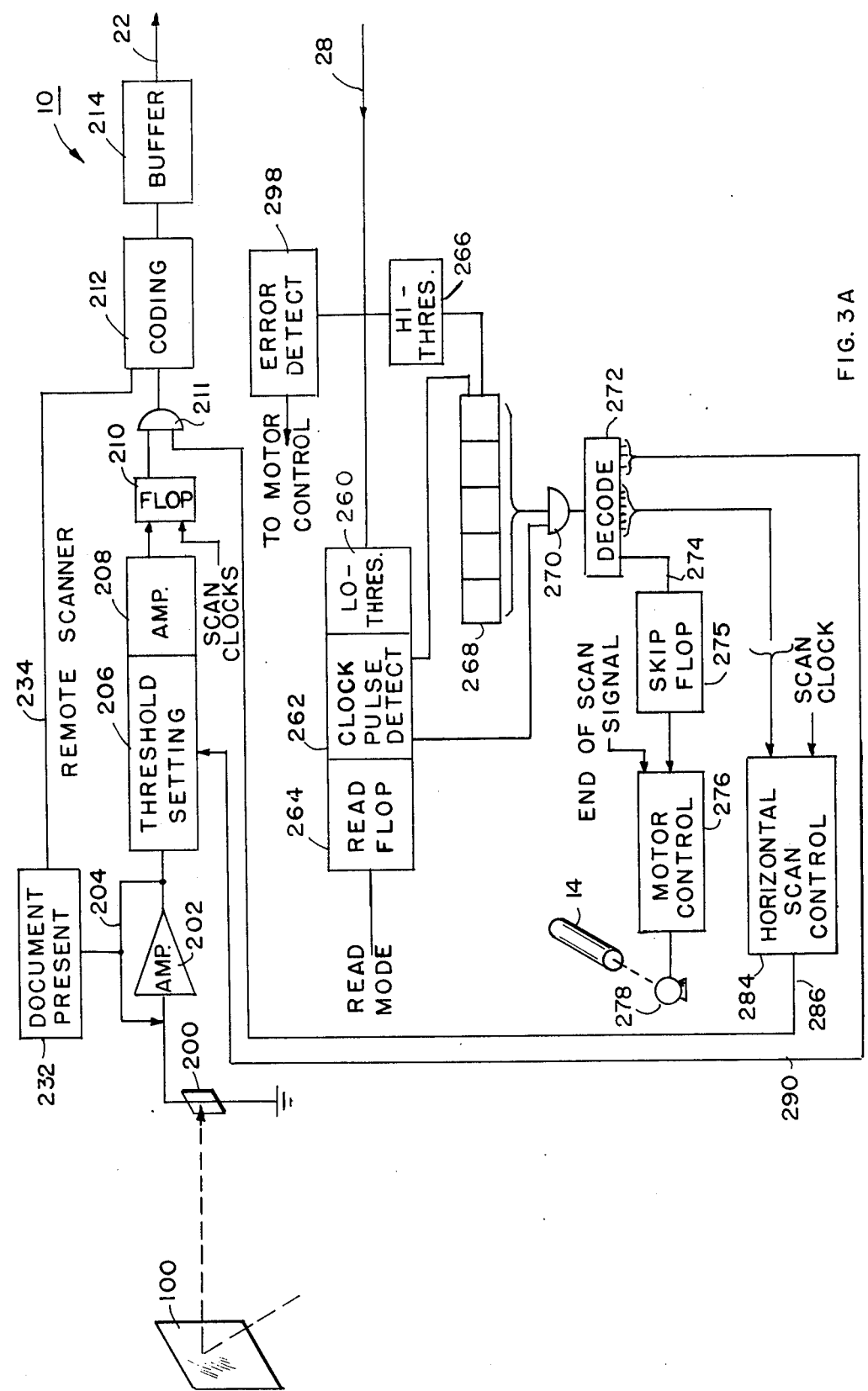
FIGS. 3A, 3B and 3C shows details of the control system responsive to the control indicia.
Figure 3B:
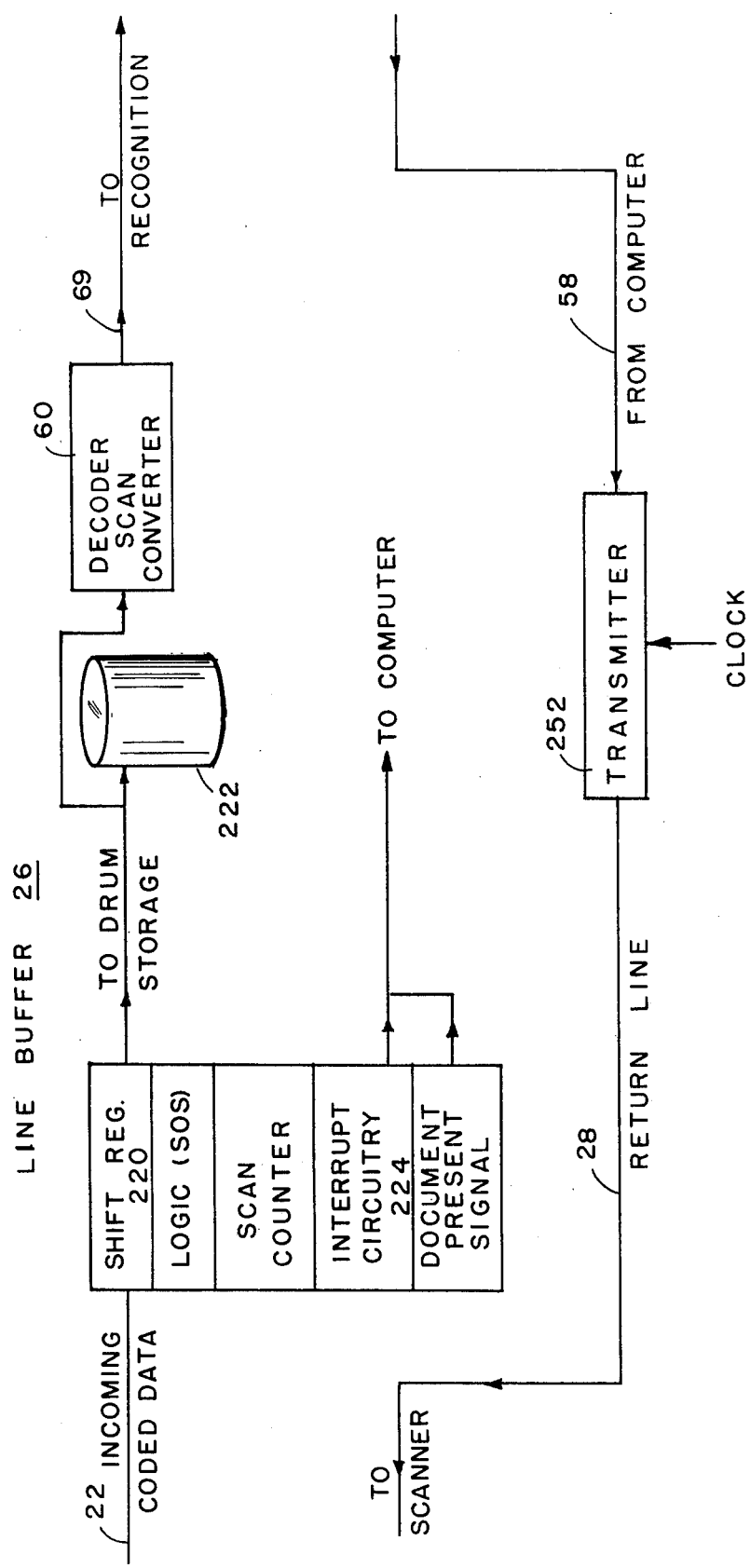
Figure 3C:
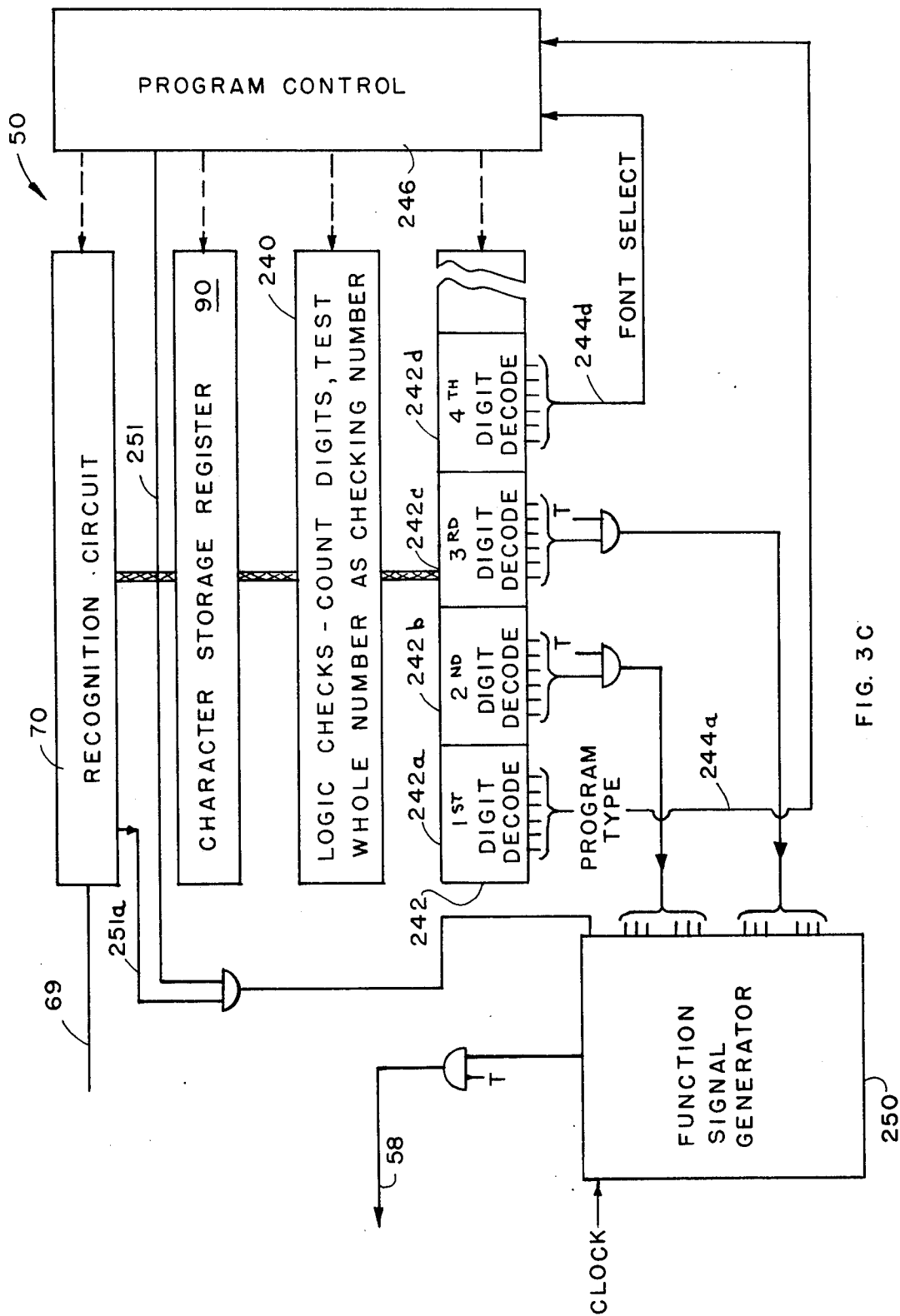

FIG. 3 has been included to present details of one system embodiment for carrying out the particular functions discussed above. In this diagram, certain of the functions which typically would be carried out by computer manipulations have been represented by conventional block diagrams, to clarify the nature of the operations, and also to indicate that in some instances hardware could be used for such purposes, even though in general computer manipulations will be the most efficient mode of handling the problem.

Referring now to the left-hand portion of FIG. 3, there is shown schematically a light-sensor 200 which detects the light reflected from the document 100 as the laser beam sweeps thereacross. This sensor produces a corresponding output voltage which is fed to a pre-amplifier 202, having a conventional normalizing feedback circuit 204. The amplified output is directed to a known threshold circuit 206 which is association with an amplifier 208 produces a binary output indicating whether the reflected light intensity is above or below a selected threshold level. The output of amplifier 206 is directed to a flip-flop 210, clocked by scan clock pulses derived in known fashion, and operable to produce on the output of the flip-flop a series of binary (black-white) pulses indicating the presence or absence of character elements at uniformly-spaced points along the scan path.

The clocked pulses from flip-flop 210 are fed to an AND gate 211, controlled in a manner to be explained, and which when opened directs the black-white pulses to coding apparatus generally indicating at 212. Such coding appartus is disclosed in the above-mentioned parent application Ser. No. 701,670, and produces a series of code groups indicating the scan lengths between particular events occurring during a scan, such as successive white-to-black transitions. The code groups are stored in a buffer 214 for subsequent transmission over the outgoing line 22 leading to the central station 24.

The coded data is received at the central station 24 and directed to a line buffer 26. The line buffer temporarily stores the data in a circulating shift register 220 from which the data ultimately is transferred to a magnetic drum 22, in accordance with the operation of associated logic circuits. When a complete text line has been so stored, the interrupt circuit 224 is activated to the computer 50, and the data on the drum is read out to the decoder scan converter 60, and from there to the recognition circuit 70, all as previously disclosed.

The recognition circuit 70 performs in known fashion to determine the identify of each of the characters of the line of text. Signals identifying these characters are placed in a storage register 90 for subsequent processing. One such storage register may be assigned to each scanner 10.

The computer 50 checks to determine whether the characters stored in the register 90 represent an ID Number 102. If they do, the computer processes the character signals in a predetermined manner to develop the information and instructions applicable to the particular form being scanned.

As noted hereinabove, the ID Number 102 possesses the distinguishing characteristic of a special location on the document 100; that is, the ID control character indicia are located in the upper left-hand portion of the document. Thus, to determine that the character signals in the register 90 represent an ID Number, the computer program includes a routine to check whether the signals are the first to be derived from the document being scanned. To do this, the computer needs only to be seat a signal when the document is first inserted into the scanner, and the computer program can be arranged in any conventional manner to determined whether the stored text line is the first received after that signal was received.

The scanner 10 can of course be provided with any of various means for detecting the insertion of a document and sending a distinctive signal thereof to the computer 50. Rather than using a mechanical detector, the scanner preferably may be provided with a "document present" circuit 232 coupled to the feedback circuit 204 of amplifier 202. When no document is present, no light is reflected to the sensor 200, and thus no feedback signal generated. When a document is inserted, the reflection of light produces a feedback signal which is detected by the document-present circuit 232. This circuit directs a corresponding signal through a line 234 to cause the coding apparatus 212 to produce a special document-present signal to be sent to the central station 24 for transfer to the computer 50 and utilization as described above in recognizing the ID Number as the set of characters first scanned from the document.

The computer 50 also is programmed to make logic checks on the ID Number characters. This procedure is illustrated by the block 240 in FIG. 3. Specifically, the computer determines the number of characters to be sure there are nineteen in all. The computer also examines the ID Number to be sure it is a "checking number", i.e. that the sum of the check digit and all of the other digits (including certain substitutes is a multiple of ten. If these logic checks do not prove out, the ID Number characters are sent by the computer to the CRT display 86 (FIG. 1) for examination by the operator.

All characters on the CRT display 86 are "marked" by an arrow or the like, to indicate to the operator that there is an error present in the number. If the operator can see that the information presented is improper for an ID designation, she may actuate a so-called "kille button" to send a signal back to the scanner instructing it to eject the document and activate an alarm light to gain the attention of the operating personnel at the remote station.

If the ID Number checks out, the computer 50 thereupon carries out a sequence of steps whereby specific characters of the number are decoded and corresponding function signals are generated to carry out the required action specified. Such decoding is a conventional operation in computer data manipulations, and a variety of program sequences can be devised in known fashion to produce the desired results. Simply to illustrate this decoding function, however, FIG. 3 includes a block 242 presenting a number of conventional decoding circuits 242a, 242b, etc., for analyzing respective characters of the ID Number. Each decoding circuit produces an output signal (i.e. a "high" level on one lead of the output circuit leads) identifying the particular number decoded. Such signal is transmitted to means for carrying out the specified function.

The output signals of the decoding circuits 242a and 242d for the first and fourth digits of the ID Number serve to control certain functions at the central station, and thus have been shown directed through lines 244a and 244d to the computer program control circuitry 246. Specifically, the first digit distinguishes the program type, and thus the corresponding output signal directly determines the further program sequences applicable to the document being scanned. The fourth digit represents the type of character to be read from the document, and thus the corresponding decode signal is also directed to the program control 246 to select the particular recognition program for that character type. If separate hardware is used for the recognition sequences, rather than program-controlled computer manipulations, the decoder output signal will be directed to such hardware to place it in the proper mode of operation for the particular character type indicated.

The second and third digits of the ID Number control corresponding functions at the remote scanner 10. Such signals could be sent directly back to the corresponding scanner, by various conventional means. However, it is advantageous to utilize for such signaling the basic communication system of the remote optical character recognition system, simply because such utilization provides important advantages of economy and simplicity. Thus the outputs of decoding circuits 242b and 242c are shown connected to a "function-signal generator" generally indicated at 250, and which produces serially-coded permutation output signals corresponding to the numbers decoded from the ID digits.

Preferably, the function-signal generation will be effected by the computer 60 through the means of a suitable program to produce in known fashion such serially-coded output signals. The block diagram showing in FIG. 3 is in essence a schematic representation of the coding operation, although of course the task can be accomplished by conventional hardware. In any event, in one embodiment the signal generator 250 serves to produce six-bit binary code groups corresponding to the outputs from the decoding circuits 242b and 242c, with the sixth bit always a zero. The permutation code of the other five bits identifies the specific command, i.e. whether skip distance, or alteration of the horizontal scan zone.

The function signal generator 250 also is arranged to produce a six-bit code specifying a change in the threshold level of the electronic detector circuitry at the scanner 10, for use when regular text lines are being read (not the ID Number). This threshold circuit may for example have three possible levels, i.e., light, medium and dark, and ordinarily the scanner would be set on the medium level at the start of reading. If the characters inserted on the document are excessively heavy (or light), such characteristic can be determined in known fashion by the recognition circuitry, as explained in copending application Ser. No. 758,219, filed on Sept. 9, 1968, by the present applicant. Simultaneously, the computer can determine how many characters in the line of text were not recognized, and if the number was above some pre-selected level, the computer will produces a signal on a line 251. This signal combines with a signal on line 251a from the recognition circuit 70 indicating too heavy (or light) character density, and together the signals cause the function-signal generator 250 to produce a corresponding six-bit code.

All the six-bit code groups developed by the function signal generator 250 are directed to a transmitter 252 which normally produces for the remote scanners a continuous stream of clock pulses to serve as the "Read" command, as described in the above-identified pending parent application Ser. No. 701,670. Each six-bit code group is combined in the transmitter with the clock pulses to produce corresponding six-bit binary codes of the type comprising "single-height" and "double-height" pulses, but with the sixth bit zero. Such combining circuitry may be conventional, using known logical techniques, and thus will not be described herein. The effect is, however, that each pulses of the original six-bit code combines with a clock pulse to produce a double-height pulse, and each "zero" of the original code results in single-height pulse except that the "zero" of the sixth bit causes a corresponding zero in the transmitter output.

Referring now to the remote scanner 10 shown in FIG. 3, the pulses coming in on the return line 28 are directed through a low-threshold circuit 260 to a clock pulse detector circuit 262. Clock pulses pass through threshold circuit 260 and operate the detector 262 which thereupon sets a Read Flop 264 to condition the scanner to its "Read Mode". In this mode, the scanner is set to produce means signals for the computer 50.

The return line 28 also is connected to a high-threshold circuit 265 which passes only the double-height pulses of a received code group. Such pulses are directed from circuit 266 to a five-bit register 268 which is stepped by clock pulses from circuit 262, so that the first five bits of a six-bit code will appear in this register when the sixth (zero) but is received. This sixth bit is detected by circuit 262, which switches the scanner out of "Read Mode", and simultaneously opens a gate 270 to read out the register 268 to a decoding circuit 272.

If the code in register 268 signifies a command for the scanner to skip to a subsequent text line on the document, the decoder 272 activates a lead 274 to set a "skip flop" 275. The output of this flop is one input to a motor control circuit 276 (another input to which is the end-of-scan signal to index the drum one step between each sweep of the beam during a reading operation). While the flop 275 is set, the drum stepping motor 278 will operate continuously to index the document drum 14 at high speed.

Thus the motor 278 will stop the drum 14 at maximum speed until the next command code has been stepped into register 266 and decoded. If the next code is another skip signal, the motor will continue to advance the drum for another skip cycle, i.e. the time duration of a serial six-bit command code. In one embodiment, the time duration of each code group was 3 milliseconds (for six pulses). A typical skip distance of, say, 1 inch will require that the computer 50 (operating under program control) produce a number of successive skip commands to advance the document to the required position.

The function signal for the horizontal scan control may advantageously comprise two or more six-bit codes, the frist code serving to establish that the signal is for horizontal scan control, and the second (or others) to define the starting and ending points of the horizontal scan. The control apparatus for this purpose is illustrated in FIG. 3 by a block 284 labeled "Horizontal Scan Control" and containing conventional circuits responsive to the output signals of the decoder 272 for producing a scan control signal on lead 286.

For example, the control apparatus circuitry 284 may include a conventional counter responsive to scan clock pulses. This counter is activated (i.e. prepared for a counting operation) by a signal from the frist six-bit code signal signifying a horizontal scan control command. The counter thereafter may be started counting by the "start-of-scan" (SOS) signal, which occurs when the laser scanning beam first begins its sweep across the document. The counter ultimately will be reset by the "end-of-scan" signal (see the above-mentioned pending application Ser. No. 701,670), which occurs, for example, after 1024 clock pulses have been counted, for a full sweep across the document.

During the counting operation, the signals developed by decoding the six-bit codes subsequent to the first horizontal scan code can be used to define numbers for comparison with the counter output. Thus when the counter reaches the number corresponding to the first of these subsequent codes, a "high" output is produced on line 286. When the counter reaches the number corresponding to the second subsequent code, the line 286 goes "low". Thus, an "unblanking" pulse is developed for output gate 211, defining a starting and ending position for the horizontal scan segment as the beam sweeps across the document.

If the decoder 272 receives a code group signaling a change in the threshold level of the scanning detector, the decoder will produce a corresponding control signal on a line 290. This line is connected to the threshold-setting circuit 206 and the control signal it carries operaes, through conventional means such as a solid-state switch or the like, to change the threshold level of the detector to a new value, either lighter or darker than the previous setting. Such a change in the threshold setting involves conventional electronic techniques, and thus will not be described in detail herein.

The Field Codes are decoded by the computer 50 in much the same way as in decoding digits of the ID Number, so as to produce function signals for carrying out the specific commands concerning the corresponding data fields. That is, the recognized Field Code characters are transferred to the storage register 90 for appropriate processing in accordance with the computer program, and function signals are developed for the specified commands to aid in processing the document.

It may be noted that for certain Field Codes, the computer will be arranged to remember the horizontal location of a control character, so as to permit identifying the characters in corresponding fields below that control character. Such horizontal location can conveniently be derived from the raw data stored in the decoder scan converter, because the storage position of each bit of that data identifies a corresponding location for a character element on the data grid of the original set of scans through the line of text. Thus, when the computer reads out from the decoder scan converter the data bits for a Field Code character, and the recognition circuitry 70 determines that the character is a specified marked control character (such as the 5 in document 100), the computer will in response to such determination store a corresponding signal in its memory for use when subsequently reading and processing the next line of text. That is, for each character read in the subsequent line, the computer will check to determine if its location (horizontally) in the decoder scan converter is that of a previously-identified specially marked control character. If so, the computer program carries out the programmed steps, such as placing the recognized number in the accumulator.

At times, a document may inadvertently be inserted in the scanner in a skewed position. Thus, the data in the field below a marked control character may not all appear to be in the same location (horizontally), raising a possibility that errors will be made in assigning recognized characters to the proper data field.

Such a problem is avoided in accordance with another feature of this invention by the use of a distinctive reference mark or "bench mark", pre-printed on the document in a predetermined position below a control character. In the document 100, the bench-mark is a 0, shown a little more than half-way down the left-hand side of the document, and having a predetermined position approximately beneath the control character 9.

When the scanner reaches the text line containing the 0, it will transmit that character to the computer 50 along with any other information characters in the text line. The computer will recognize the 0 as a bench mark, and will compare its horizontal position with that of the horizontal position of the corresponding control character 9. If the 0 is within a specified tolerance with respect to the 9, the computer will do nothing concerning skew angle. However, if there is a discrepancy, the computer will determine the amount of horizontal shift which had appeared, and will modify the subsequent character analyzing program so as to offset horizontally the apparent location of information characters detected in that text line and in subsequent text lines. Thus, the information characters subsequently will be assigned the correct horizontal positions with respect to control characters above them which define the data field. It may be noted that the actual amount of horizontal discrepancy will increase for each subsequent text line, but as a practical matter a fixed amount of horizontal offset compensation is adequate for most applications.

In addition to the specific commands pertaining to skip distance, horizontal scan zone, etc., discussed above as specific examples of the kinds of controls to be effected, the system typically will include a variety of other functions. For example, the function-signal generator 250 will be arranged to produce a specific command to "skip out" the document. Such a command may consist of a corresponding six-bit code, followed by a steady stream of clock pulses to provide phase signals after the document has been ejected from the scanner; the scanner will be arranged to ignore the clock pulses, i.e. not to switch to Read Mode, while the document is being skipped out.

The function-signal generator 250 (i.e. the computer program) also may be arranged to produce a code commanding the stepping motor 278 to operate in reverse. During such reverse movement, the scanning will continue and scan signals developed, but no recognition sequences will be carried out at the central station. After the scanner has reached the top of the text line, the stepping motor will stop, and will automatically be started again in forward direction so as to re-scan the text line involved.

Another important function is that of interrupting stepping of the drum, e.g. until the computer completes certain processing precedent to making a decision to proceed, or to repeat a text line, or the like. Such a "hold" command, produced by the computer as a six-bit code, will be decoded at the scanner and used to activate a signal blocking the energizing circuit of the stepping motor 278, in a conventional manner.

The computer also is arranged to produce an "error" signal, indicating that for some reason the material on the document cannot be processed. Thus the document should be ejected from the scanner without further processing, and the operator at the scanner should attend to the matter, such as by trying the document over again from the start, or by setting aside the problem document for examination, and going on to the next document.

In the preferred embodiment, the computer signals an "error" not by the usual six-bit code, but by blanking the clock pulses from the return line 28. The scanner includes a detector 298 responsive, after a predetermined time delay, to the absence of any signals on the return line. This detector is operable (through conventional means, not shown) to direct the motor control circuit 276 to skip-out the document, and also to actuate an operator alarm, such as by lighting a red light on the scanner. This error signal also can be developed manually by the operator at the CRT display unit 86, by actuating a so-called "kill button" when it is clear that the information read from the document and shown on the CRT cannot be deciphered.

Although one embodiment of the invention has been described in detail herein, it is to be understood that this is for the purpose of illustrating the invention and is not to be construed in a limiting sense; it is clear that many modifications to the invention can be made by those skilled in the art, based on the teaching herein, and within the scope of the present invention which is to be considered limited only by the prior art.

I claim:

1. A record medium for storing data entered in the form of alphanumeric characters to be scanned by an optical character recognition apparatus having facilities to analyze scan signals to provide recognition of such characters and processing of the stored data comprising:
   a record member comprising a document to be scanned by an optical character recognition scanner;
   a plurality of sets of indicia means formed on said document with each set defining a series of horizontally-adjacent separate rectangular spaces each dimensioned to have entered therein a corresponding individual two-dimensional alphanumeric information character the shape of which carries intelligence, the sets of characters when entered representing respective fields of data to be stored in said record member;
   said sets of indicia means being positioned in different locations on said record member yet all being located to be scanned by said optical character recognition scanner; and
   a plurality of two-dimensional alphanumeric field code characters formed on said record member and having shapes carrying instructional intelligence, said field code characters being arranged in a series of separated locations each positionally related in a predetermined manner with respect to and closely adjacent the location of a respective one of said sets of indicia means;
   said field code characters carrying said instructional intelligence embodied in the two-dimensional shapes thereof to permit recognition analysis thereof by the same facilities of said optical character recognition apparatus used to recognize said information characters;
   said field code characters being provided with distinctive stylistic configurational characteristics embodied in the character format of at least certain of the field code characters and serving to permit said optical character recognition apparatus to distinguish the field code characters from said alphanumeric information characters, said field code characters, upon scanning and recognition by said optical character recognition apparatus, serving to provide to that apparatus instructional intelligence for directing the processing by that apparatus of the corresponding alphanumeric information characters.

2. A record medium as claimed in claim 1, wherein said field code characters are located immediately to the left of the corresponding set of indicia means.

* * * * *